US012259682B2

(12) United States Patent
Uratani et al.

(10) Patent No.: US 12,259,682 B2
(45) Date of Patent: Mar. 25, 2025

(54) TONER

(71) Applicant: CANON KABUSHIKI KAISHA, Tokyo (JP)

(72) Inventors: Kozue Uratani, Shizuoka (JP); Kenta Kamikura, Kanagawa (JP); Kosuke Fukudome, Tokyo (JP); Tetsuya Kinumatsu, Shizuoka (JP); Takuya Mizuguchi, Shizuoka (JP); Yuta Komiya, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 434 days.

(21) Appl. No.: 17/643,949

(22) Filed: Dec. 13, 2021

(65) Prior Publication Data

US 2022/0206402 A1 Jun. 30, 2022

(30) Foreign Application Priority Data

Dec. 25, 2020 (JP) ................................ 2020-217550

(51) Int. Cl.
*G03G 9/08* (2006.01)
*G03G 9/087* (2006.01)
*G03G 9/097* (2006.01)

(52) U.S. Cl.
CPC ....... *G03G 9/08711* (2013.01); *G03G 9/0819* (2013.01); *G03G 9/09733* (2013.01)

(58) Field of Classification Search
CPC ............. G03G 9/0819; G03G 9/08711; G03G 9/09733
See application file for complete search history.

(56) References Cited

U.S. PATENT DOCUMENTS

| | | | | |
|---|---|---|---|---|
| 8,367,289 | B2 * | 2/2013 | Isono | G03G 9/0827 430/108.4 |
| 8,603,712 | B2 | 12/2013 | Aoki et al. | |
| 8,741,519 | B2 | 6/2014 | Watanabe et al. | |
| 8,785,101 | B2 | 7/2014 | Kaya et al. | |
| 8,828,639 | B2 | 9/2014 | Kamikura et al. | |
| 8,846,284 | B2 | 9/2014 | Kinumatsu et al. | |
| 8,918,035 | B2 | 12/2014 | Hasegawa et al. | |
| 9,034,549 | B2 | 5/2015 | Shiotari et al. | |
| 9,040,216 | B2 | 5/2015 | Fukudome et al. | |

(Continued)

FOREIGN PATENT DOCUMENTS

| | | | |
|---|---|---|---|
| JP | 2014-35506 | A | 2/2014 |
| JP | 2019-86641 | A | 6/2019 |

(Continued)

OTHER PUBLICATIONS

U.S. Appl. No. 17/519,938, filed Nov. 5, 2021, Yuta Komiya.
U.S. Appl. No. 17/520,044, filed Nov. 5, 2021, Dai Nozaki.
U.S. Appl. No. 17/643,525, filed Dec. 9, 2021, Kenta Kamikura.

*Primary Examiner* — Peter L Vajda
*Assistant Examiner* — Boone Alexander Evans
(74) *Attorney, Agent, or Firm* — VENABLE LLP

(57) ABSTRACT

A toner including a toner particle containing a binder resin and an ester compound, wherein the binder resin contains a styrene-acrylic-based resin, the styrene-acrylic-based resin contains a specific unit, the ester compound has a specific structure, and a molar ratio of the specific unit to the ester compound is 0.5 to 1.5.

10 Claims, 1 Drawing Sheet

(56) References Cited

U.S. PATENT DOCUMENTS

| | | | |
|---|---|---|---|
| 9,116,448 | B2 | 8/2015 | Terauchi et al. |
| 9,134,637 | B2 | 9/2015 | Hotta et al. |
| 9,141,012 | B2 | 9/2015 | Moribe et al. |
| 9,244,371 | B2 | 1/2016 | Suzumura et al. |
| 9,256,148 | B2 | 2/2016 | Fujikawa et al. |
| 9,261,806 | B2 | 2/2016 | Moribe et al. |
| 9,285,697 | B2 | 3/2016 | Fukudome et al. |
| 9,304,422 | B2 | 4/2016 | Matsui et al. |
| 9,309,349 | B2 | 4/2016 | Watanabe et al. |
| 9,348,246 | B2 | 5/2016 | Magome et al. |
| 9,354,545 | B2 | 5/2016 | Matsui et al. |
| 9,377,708 | B2 | 6/2016 | Magome et al. |
| 9,423,711 | B2 | 8/2016 | Uratani et al. |
| 9,429,860 | B2 | 8/2016 | Kinumatsu et al. |
| 9,442,416 | B2 | 9/2016 | Magome et al. |
| 9,470,993 | B2 | 10/2016 | Nishikawa et al. |
| 9,588,450 | B2 | 3/2017 | Tsuda et al. |
| 9,594,323 | B2 | 3/2017 | Fujikawa et al. |
| 9,606,462 | B2 | 3/2017 | Nomura et al. |
| 9,625,842 | B2 | 4/2017 | Uratani et al. |
| 9,625,844 | B2 | 4/2017 | Kaya et al. |
| 9,658,546 | B2 | 5/2017 | Tanaka et al. |
| 9,658,554 | B2 | 5/2017 | Kinumatsu et al. |
| 9,798,256 | B2 | 10/2017 | Kosaki et al. |
| 9,798,262 | B2 | 10/2017 | Toyoizumi et al. |
| 9,804,514 | B2 | 10/2017 | Suzumura et al. |
| 9,811,016 | B2 | 11/2017 | Aoki et al. |
| 9,823,595 | B2 | 11/2017 | Toyoizumi et al. |
| 9,841,692 | B2 | 12/2017 | Hasegawa et al. |
| 9,857,707 | B2 | 1/2018 | Tsuda et al. |
| 9,857,713 | B2 | 1/2018 | Kosaki et al. |
| 9,869,943 | B2 | 1/2018 | Aoki et al. |
| 9,880,478 | B2 | 1/2018 | Shimano et al. |
| 9,897,932 | B2 | 2/2018 | Hotta et al. |
| 9,952,523 | B2 | 4/2018 | Shimano et al. |
| 9,964,874 | B2 | 5/2018 | Suzumura et al. |
| 9,971,263 | B2 | 5/2018 | Fukudome et al. |
| 10,101,683 | B2 | 10/2018 | Nishikawa et al. |
| 10,197,934 | B2 | 2/2019 | Matsui et al. |
| 10,228,627 | B2 | 3/2019 | Nagashima et al. |
| 10,228,630 | B2 | 3/2019 | Mizuguchi et al. |
| 10,241,430 | B2 | 3/2019 | Kimura et al. |
| 10,289,016 | B2 | 5/2019 | Fukudome et al. |
| 10,295,921 | B2 | 5/2019 | Ohmori et al. |
| 10,303,074 | B2 | 5/2019 | Yamawaki et al. |
| 10,310,396 | B2 | 6/2019 | Kamikura et al. |
| 10,310,397 | B2 | 6/2019 | Sano et al. |
| 10,338,487 | B2 | 7/2019 | Kamikura et al. |
| 10,345,726 | B2 | 7/2019 | Nakamura et al. |
| 10,353,308 | B2 | 7/2019 | Hatakeyama et al. |
| 10,401,750 | B2 | 9/2019 | Nakamura et al. |
| 10,409,180 | B2 | 9/2019 | Koji et al. |
| 10,416,582 | B2 * | 9/2019 | Nakagawa ........... G03G 9/0825 |
| 10,429,757 | B2 | 10/2019 | Yoshida et al. |
| 10,503,090 | B2 | 12/2019 | Tominaga et al. |
| 10,539,893 | B2 | 1/2020 | Tanaka et al. |
| 10,539,899 | B2 | 1/2020 | Nakamura et al. |
| 10,545,420 | B2 | 1/2020 | Kinumatsu et al. |
| 10,545,422 | B2 | 1/2020 | Yamawaki et al. |
| 10,551,758 | B2 | 2/2020 | Tanaka et al. |
| 10,578,990 | B2 | 3/2020 | Tsuda et al. |
| 10,635,010 | B2 | 4/2020 | Kamikura et al. |
| 10,698,327 | B2 | 6/2020 | Nagashima et al. |
| 10,732,530 | B2 | 8/2020 | Matsui et al. |
| 10,782,623 | B2 | 9/2020 | Yoshiba et al. |
| 10,845,722 | B2 | 11/2020 | Nishikawa et al. |
| 10,859,933 | B2 | 12/2020 | Kinumatsu et al. |
| 10,877,387 | B2 | 12/2020 | Fukudome et al. |
| 10,877,388 | B2 | 12/2020 | Aoki et al. |
| 10,877,389 | B2 | 12/2020 | Kamikura et al. |
| 10,895,815 | B2 | 1/2021 | Kamikura et al. |
| 11,003,103 | B2 | 5/2021 | Kinumatsu et al. |
| 11,092,905 | B2 | 8/2021 | Fukudome et al. |
| 11,099,493 | B2 | 8/2021 | Komiya et al. |
| 11,112,708 | B2 | 9/2021 | Uratani et al. |
| 11,169,458 | B2 | 11/2021 | Toyoizumi et al. |
| 11,175,600 | B2 | 11/2021 | Uchiyama et al. |
| 11,181,839 | B2 | 11/2021 | Yamashita et al. |
| 11,181,840 | B2 | 11/2021 | Nagata et al. |
| 11,181,844 | B2 | 11/2021 | Nagaoka et al. |
| 11,181,846 | B2 | 11/2021 | Kinumatsu et al. |
| 11,256,187 | B2 | 2/2022 | Ogaki et al. |
| 2015/0185658 | A1 | 7/2015 | Wakabayashi et al. |
| 2016/0378003 | A1 | 12/2016 | Arimura et al. |
| 2020/0142329 | A1 | 5/2020 | Yamawaki |
| 2020/0356019 | A1 | 11/2020 | Matsui et al. |
| 2020/0409282 | A1 | 12/2020 | Unno et al. |
| 2021/0026262 | A1 | 1/2021 | Kenmoku et al. |
| 2021/0026264 | A1 | 1/2021 | Kamikura et al. |
| 2021/0026265 | A1 | 1/2021 | Kamikura et al. |
| 2021/0080846 | A1 | 3/2021 | Mizuguchi et al. |
| 2021/0356878 | A1 | 11/2021 | Mizuguchi et al. |

FOREIGN PATENT DOCUMENTS

| | | | |
|---|---|---|---|
| JP | 2019-86764 | A | 6/2019 |
| JP | 2019-219646 | A | 12/2019 |
| JP | 2020-76992 | A | 5/2020 |

* cited by examiner

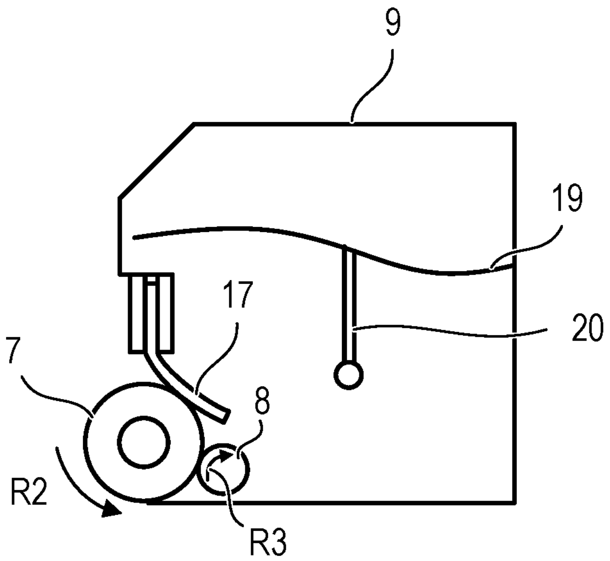
9
19
17
20
7
8
R2
R3

TONER

This application claims the benefit of Japanese Patent Application No. 2020-217550, filed Dec. 25, 2020, which is hereby incorporated by reference herein in its entirety.

BACKGROUND OF THE INVENTION

Field of the Invention

The present invention relates to a toner used in a copier and a printer with an electrophotographic system or an electrostatic recording system.

Description of the Related Art

In recent years, low power consumption and higher image quality are required for printers and copiers. In order to meet the demand for low power consumption, there is preferable a toner that is rapidly melted at a lower temperature, that is, has excellent low-temperature fixability.

Conventionally, in order to improve the low-temperature fixability of the toner, a method of adding a plasticizer to the toner has been widely used. The plasticizer is rapidly melted by heat to plasticize the binder resin, allowing the viscosity of the toner at melting to be reduced.

However, when the amount of the plasticizer added in the toner is large, the plasticizer liquefied during melting seeps into the surface of the toner, and a layer of the plasticizer may be partially formed on the surface of the image formed by using the toner. Then, light is scattered in the layer of the plasticizer recrystallized after cooling, causing an adverse effect that a person looks as if unevenness occurs in color tone when viewing an image.

In recent years, an attempt has been made to enhance the compatibility between the binder resin and the plasticizer, in order that the plasticizer does not seep into the surface of the toner at melting.

In Japanese Patent Application Laid-Open No. 2019-086641, a unit having a long chain alkyl group has been introduced into a part of the molecular structure of a binder resin to lower the polarity of the binder resin, thereby enhancing compatibility with a plasticizer. As a result, the plasticizer effectively plasticizes the binder resin during fixing, thus suppressing seeping of the plasticizer into the surface of the toner and suppressing occurrence of color tone unevenness.

The present inventors have confirmed that when the toner described in Japanese Patent Application Laid-Open No. 2019-086641 is used, gloss may be reduced in a part of an image when the image is left for a long period of time.

SUMMARY OF THE INVENTION

An object of the present invention is to provide a toner having excellent low-temperature fixability and capable of suppressing occurrence of color tone unevenness and gloss reduction in a formed image.

The toner according to the present invention comprises a toner particle containing a binder resin and an ester compound, the binder resin contains a styrene-acrylic-based resin, the styrene-acrylic-based resin contains a unit represented by following formula (1), the ester compound has a structure represented by formula (2) or (3) below, and a molar ratio of the unit represented by the formula (1) to the ester compound is 0.5 to 1.5, (1)

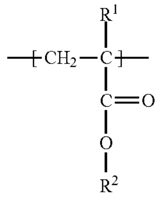

where, $R^1$ represents a hydrogen atom or a methyl group, and $R^2$ represents a linear alkyl group having 12 carbon atoms, and (2)

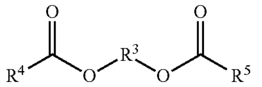

(3)

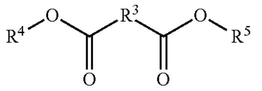

where, $R^3$ represents an alkylene group having 2 to 4 carbon atoms, and $R^4$ and $R^5$ each independently represent a linear alkyl group having 14 to 22 carbon atoms.

Further features of the present invention will become apparent from the following description of exemplary embodiments with reference to the attached drawing.

BRIEF DESCRIPTION OF THE DRAWINGS

FIGURE is a schematic view of a process cartridge used for evaluation of a toner in Examples.

DESCRIPTION OF THE EMBODIMENTS

Preferred embodiments of the present invention will now be described in detail in accordance with the accompanying drawing.

In the present invention, the expression "○○ to xx" indicating a numerical range means a numerical range including a lower limit and an upper limit which are end points unless otherwise specified.

The monomer unit refers to a form after a polymerization reaction of a monomer substance in a polymer or a resin.

In an image formed by using the toner described in Japanese Patent Application Laid-Open No. 2019-086641, coarse crystals of an ester compound have been formed on the surface of the image in a portion where the gloss reduced, and it has been presumed that this is because the reflection intensity of light is changed in a portion having coarse crystals on the image.

The toner described in Japanese Patent Application Laid-Open No. 2019-086641 has had an excessive unit having an alkyl group in the binder resin as compared with the ester compound, and it is thus considered that the ester compound remains compatible with the binder resin after cooling. Furthermore, when the image was left for a long period of time, it was considered that the ester compound was gradually oriented and grown to form coarse crystals and the gloss was remarkably lowered.

The present inventors performed investigations for further suppressing occurrence of both color tone unevenness and gloss reduction of an image in a toner with an ester compound for improving low-temperature fixability. As a result, it has been found that the above effect can be obtained by designing the ester compound and the binder resin to be used in the toner as follows.

That is, the toner according to the present invention includes a toner particle containing a binder resin and an ester compound; the binder resin contains a styrene-acrylic-based resin; the styrene-acrylic-based resin contains a unit represented by formula following (1); the ester compound has a structure represented by following formula (2) or a structure represented by following formula (3); and a molar ratio (=the unit represented by the formula (1)/the ester compound) of the unit represented by the formula (1) to the ester compound is 0.5 to 1.5, (1)

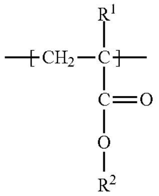

where, $R^1$ represents a hydrogen atom or a methyl group, and $R^2$ represents a linear alkyl group having 12 carbon atoms, and (2)

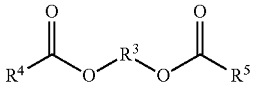

(3)

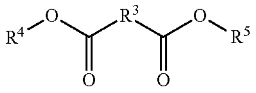

where, $R^3$ represents an alkylene group having 2 to 4 carbon atoms, and $R^4$ and $R^5$ each independently represent a linear alkyl group having 14 to 22 carbon atoms.

The binder resin of the toner according to the present invention contains a styrene-acrylic-based resin, and the styrene-acrylic-based resin further contains a unit represented by the formula (1). As a result, the SP value $(J/m^3)^{0.5}$ of the binder resin is relatively small.

Furthermore, the difference in the SP value between the binder resin and the plasticizer is reduced to enhance the compatibility at melting by using the ester compound represented by the formula (2) or the ester compound represented by the formula (3) as the plasticizer.

The unit represented by the formula (1) has an alkyl group having 12 carbon atoms (hereinafter, also referred to as a lauryl group). The present inventors variously investigated the number of carbon atoms in the alkyl group of the unit in the binder resin, and have found that it is optimal to use a lauryl group in order to suppress the color tone unevenness and the gloss reduction.

The SP value of the unit represented by the formula (1) is 18.7. In order to lower the SP value of the binder resin, the number of carbon atoms of the alkyl group of the unit in the binder resin may be increased. However, when the carbon chain of the alkyl group is too long, the difference in the SP value from the styrene monomer unit (SP value of 20.1) as the main skeleton increases, and a site having a large SP value and a site having a small SP value coexist in the binder resin.

In the binder resin having a large difference of the SP value as described above, when the molecular motion becomes active by heating during fixing, sites having a small SP value are aggregated each other and sites having a large SP value are aggregated each other. In the site having a large SP value, the ester compound is hardly compatible, and therefore the layer is separated and the ester compound easily seeps into the surface of the toner, and as a result, color tone unevenness easily occurs.

In the unit represented by the formula (1), the difference in the SP value from the styrene monomer unit was 1.4, and according to the investigation of the present inventors, the binder resin and the ester compound were uniformly compatible with each other, allowing color tone unevenness to be effectively suppressed.

In addition, in the present invention, the ester compound includes a bifunctional ester compound represented by the formula (2) or a bifunctional ester compound represented by the formula (3).

The bifunctional ester compound has a linear molecular structure with high mobility, has a high plasticizing effect, and is excellent in low-temperature fixability. Furthermore, the bifunctional ester compound has a higher SP value in common and higher compatibility with the binder resin, as compared with a paraffin wax or a monofunctional ester compound having the same linear molecular structure.

In addition, the ester compound used in the present invention has a linear alkyl group having 14 to 22 carbon atoms at both terminals of the molecular structure. That is, the number of carbon atoms of the linear alkyl group of the ester compound is close to the number of carbon atoms of the lauryl group of the unit represented by the formula (1), and the alkyl group of the ester compound and the lauryl group in the binder resin are easily aggregated each other at melting. As a result, the orientation of the lauryl group and the alkyl group of the ester compound during cooling serves as a starting point for recrystallization of the ester compound, and the ester compound easily forms crystals throughout the binder resin. As a result, crystals formed by the ester compound become fine, and the gloss reduction due to coarse crystals can be suppressed.

In the present invention, the molar ratio of the unit represented by the formula (1) to the ester compound represented by the formula (2) or the ester compound represented by the formula (3) is 0.5 to 1.5.

The molar ratio of 0.5 or more can increase the compatibility between the ester compound and the binder resin during fixing, allowing suppressing the seep of the liquefied ester compound into the surface of the toner. This can suppress formation of a crystal layer of an ester compound on a part of the image surface after cooling, and suppress color tone unevenness. When the molar ratio is less than 0.5, the amount of the unit represented by the formula (1) is small with respect to the amount of the ester compound, and therefore the ester compound cannot be sufficiently compatible with the binder resin.

In addition, when the molar ratio is 1.5 or less, rapid recrystallization of the ester compound is promoted during cooling to suppress formation of coarse crystals, allowing the gloss reduction to be suppressed.

The reason why recrystallization of the ester compound is promoted when the molar ratio is 1.5 or less is presumed as follows.

When the molecular motion becomes active during melting of the toner, the lauryl group aggregates due to high affinity with the alkyl group of the ester compound, and is oriented during cooling, thereby causing a starting point for recrystallization of the ester compound. When the lauryl group is present in excess with respect to the alkyl group of the ester compound, the alkyl groups of the ester compound are oriented with each other, the lauryl group is oriented in the course of crystal growth, and thus crystallization is inhibited. As a result, the ester compound is not crystallized and remains compatible. When the image is left for a long time in such a state, the binder resin is gradually relaxed, and the ester compound is oriented and grown to form coarse crystals.

When the molar ratio is 1.5 or less, the orientation of the ester compound is not inhibited, and therefore the ester compound is rapidly recrystallized during cooling, and the amount of the ester compound in a state of being compatible with the binder resin can be reduced. For this reason, when the image is left for a long period of time, the ester compound is hardly oriented and grown, and the gloss reduction in the image can be suppressed.

Hereinafter, the configuration of the present invention will be described in more detail.

<Binder Resin>

The binder resin contained in the toner according to the present invention contains a styrene-acrylic-based resin containing the unit represented by following formula (1), (1)

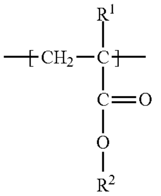

where, $R^1$ represents a hydrogen atom or a methyl group, and $R^2$ represents a linear alkyl group having 12 carbon atoms.

The binder resin containing the styrene-acrylic-based resin increases compatibility with the ester compound during fixing as described later, allowing occurrence of color tone unevenness in a formed image to be suppressed. Furthermore, controlling the molar ratio to be within a specific value range in combination with an ester compound described later can suppress the gloss reduction when the formed image is left for a long period of time.

The above $R^2$ is a lauryl group. The alkyl group of the unit in the binder resin is a lauryl group, thereby allowing decreasing the difference in the SP value from styrene which is the main skeleton while maintaining affinity with the ester compound. This can prevent the alkyl group of the unit from aggregating in the styrene-acrylic-based resin during melting to suppress locally decreasing the SP value, and thus the melted ester compound is uniformly compatible with the styrene-acrylic-based resin. This can suppress the seeping of the ester compound into the surface of the toner and suppress the occurrence of color tone unevenness in a formed image.

Furthermore, combining with the ester compound described later can promote recrystallization of the ester compound compatible with the styrene-acrylic-based resin during cooling after fixing, allowing suppressing long-term growth of the compatible component into coarse crystals. This suppresses formation of coarse crystals of the ester compound on the surface of the image left for a long period of time, and the gloss value of the image is stabilized.

The styrene-acrylic-based resin preferably contains the unit represented by the formula (1) in a ratio of 1.0 to 15.0% by mass. When the content of the unit represented by the formula (1) is 1.0 to 15.0% by mass, the styrene-acrylic-based resin is sufficiently compatible with the ester compound during melting, and can effectively function as a crystal nucleating agent of the ester compound during cooling after fixing. The content ratio of the unit represented by the formula (1) in the styrene-acrylic-based resin is more preferably 0.8 to 1.2% by mass.

In addition, the content ratio of the styrene-acrylic-based resin in the binder resin is preferably 90.0% by mass or more. This can uniformly disperse the unit represented by the formula (1) in the binder resin.

The monomer from which the monomer unit constituting the binder resin is derived includes a homopolymer or a copolymer of the following monomers.

Styrene-based monomer represented by, for example, styrene and α-methylstyrene; unsaturated carboxylic acid esters such as methyl acrylate, methyl methacrylate, ethyl acrylate, ethyl methacrylate, n-propyl acrylate, n-propyl methacrylate, iso-propyl acrylate, iso-propyl methacrylate, n-butyl acrylate, n-butyl methacrylate, lauryl acrylate, and lauryl methacrylate; acrylic-based monomers such as unsaturated carboxylic acids represented by, for example, acrylic acid and methacrylic acid; unsaturated dicarboxylic acids represented by, for example, maleic acid; unsaturated dicarboxylic anhydride represented by, for example, maleic anhydride; and nitrile-based vinyl monomers represented by, for example, acrylonitrile.

Of the above monomers, lauryl acrylate and lauryl methacrylate can be preferably used as a monomer from which the unit represented by the formula (1) is derived.

In the present invention, the glass transition temperature (Tg) of the binder resin is preferably 45.0° C. or more and less than 60.0° C. from the viewpoint of low-temperature fixability and heat resistance.

<Ester Compound>

The toner according to the present invention has an ester compound represented by the formula (2) or an ester compound represented by the formula (3) as a plasticizer.

(2)

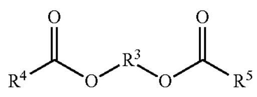

(3)

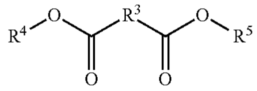

where, $R^3$ represents an alkylene group having 2 to 4 carbon atoms, and $R^4$ and $R^5$ each independently represent a linear alkyl group having 14 to 22 carbon atoms.

The ester compound represented by the formula (2) or the ester compound represented by the formula (3) has a linear molecular structure with high mobility, has a high plasticizing effect, and is excellent in low-temperature fixability. Furthermore, the ester compound has a linear alkyl group having 14 to 22 carbon atoms at both terminals of the molecular structure, and therefore the ester compound easily aggregates with the lauryl group of the binder resin during melting. This orients the lauryl group and the alkyl group of the ester compound during cooling after fixing, thereby easily recrystallizing the ester compound. As a result, it is possible to suppress long-term growth of the compatible ester compound into coarse crystals and to suppress the gloss reduction.

$R^3$ in the formulae (2) and (3) preferably represents an alkylene group having 2 carbon atoms. This decreases the molecular weight of the ester compound, thus increasing the mobility of the ester compound during melting and increasing the compatibility with the binder resin.

Preferably, $R^4$ and $R^5$ each independently represent a linear alkyl group having 14 to 18 carbon atoms. As a result, the number of carbon atoms of the linear alkyl group of the ester compound and the number of carbon atoms of the lauryl group in the binder resin become closer values, and the orientation with the lauryl group of the ester compound is further promoted.

The ester compounds represented by the formulae (2) and (3) include the following compounds. Ethylene glycol distearate, butanediol dibehenate, butanediol distearate, ethylene glycol arachidinate stearate, trimethylene glycol arachidinate stearate, ethylene glycol stearate palmitate, trimethylene glycol stearate palmitate, ethylene glycol dipalmitate, trimethylene glycol dipalmitate, ethylene glycol dimargarate, trimethylene glycol dimargarate, ethylene glycol dinonadecanate, trimethylene glycol dinonadecanate, ethylene glycol diarachidinate, trimethylene glycol diarachidinate, ethylene glycol dibehenate, and trimethylene glycol dibehenate. Of these diester compounds, ethylene glycol distearate can be preferably used.

The content ratio of the ester compound in the toner particle is preferably 5.0 to 25.0% by mass with respect to the binder resin from the viewpoint of low-temperature fixability. In addition, the content ratio of the ester compound in the toner particle is more preferably 10.0 to 20.0% by mass with respect to the binder resin, since the color tone of an image and the gloss reduction can be easily controlled. In the toner according to the present invention, the above ester compound may be used singly or in combination with another plasticizer.

In addition, preferably, domains of the ester compound exist in a cross section of the toner particle observed with a scanning transmission electron microscope, the average number of the domains in the cross section is 100 or more, and when the average major diameter of the domains is defined as r1 (μm), r1 is 1.0 μm or less. As a result, the present inventors have found that the toner is excellent in low-temperature fixability and is effective in suppressing color tone unevenness of an image.

Controlling the average number of domains present in the cross section of the toner particle to 100 or more and the average major diameter r1 (μm) of the domains to 1.0 μm or less can sufficiently suppress the orientation growth of the ester compound, and the ester compound can be finely dispersed throughout the toner. As a result, during fixing, the liquefied ester compound uniformly plasticizes the binder resin, thereby improving the low-temperature fixability. In addition, uniform compatibility of the ester compound and the binder resin with each other can suppress the seeping of the ester compound and thus suppress the occurrence of color tone unevenness of an image.

Furthermore, when the ester compound is recrystallized by cooling after fixing, the ester compound is dispersed in the toner particle, and resultant orientation suppresses coarse crystal growth. This can suppress the gloss reduction when the image is left for a long period of time.

The number of domains of the ester compound in the cross section of the toner particle and the average major diameter r1 of the domains can be controlled, for example, by introducing a cooling step in the production of the toner.

<Crosslinking Agent>

The binder resin may have a structure derived from a crosslinking agent.

Examples of the crosslinking agent include: aromatic divinyl compounds such as divinylbenzene, divinylnaphthalene, and derivatives thereof; ester compounds in which two or more carboxylic acids having a carbon-carbon double bond are ester-bonded to alcohol having two or more hydroxyl groups such as ethylene glycol dimethacrylate and diethylene glycol dimethacrylate; divinyl compounds such as N,N-divinylaniline and divinyl ether; and compounds having three or more vinyl groups.

Of such crosslinking agents, there is preferable a crosslinking agent having a structure that becomes a unit represented by following formula (4) after crosslinking. Particularly, the styrene-acrylic-based resin preferably further contains a unit represented by following formula (4), (4)

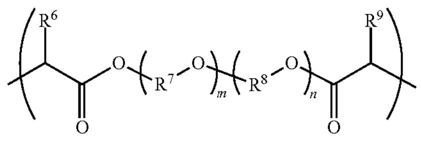

where, m+n is an integer of 2 or more, $R^6$ and $R^9$ each independently represent a hydrogen atom or a methyl group, and $R^7$ and $R^8$ each independently represent a linear or branched hydrocarbon group having 2 to 12 carbon atoms.

The crosslinking agent having a structure to be a unit represented by the formula (4) after crosslinking is characteristic in that the molecule of the binder resin easily moves during melting because the molecular structure is close to a linear form and the molecular chain is long. This provides uniform plasticization by the ester compound, and thus unevenness hardly occurs in the viscosity of the molten toner, allowing suppression of mottle. Mottle means that too low melt viscosity of the toner during fixing exerts the influence of unevenness of a paper, providing a rough image. This occurs when plasticization of the ester compound locally occurs in the binder resin during fixing to partially decrease the melt viscosity.

The content ratio of the unit represented by the formula (4) in the binder resin is preferably 0.1 to 5.0% by mass.

<Colorant>

In the present invention, the toner particle may contain a colorant. For example, in the case of producing a monochrome toner, a magnetic material can be used, and in the case of producing a color toner, colorants of black, cyan, yellow, and magenta can be used.

Examples of the magnetic material include: iron oxide such as magnetite, maghemite, and ferrite; metals such as iron, cobalt, and nickel, or alloys of these metals and metals such as aluminum, copper, magnesium, tin, zinc, beryllium, calcium, manganese, selenium, titanium, tungsten, and vanadium; and mixtures thereof.

The magnetic material may be subjected to a known surface treatment as necessary. Examples of the coupling agent that can be used in the surface treatment of the magnetic material include a silane coupling agent and a titanium coupling agent.

Examples of the black colorant include carbon black, titanium black, and magnetic powder such as iron zinc oxide and iron nickel oxide.

Examples of the cyan colorant include a copper phthalocyanine compound, a derivative thereof, and an anthraquinone compound. Specific examples thereof include C.I. Pigment Blue 2, 3, 6, 15, 15:1, 15:2, 15:3, 15:4, 16, 17:1, and 60.

Examples of the yellow colorant include compounds such as azo pigments including monoazo pigments and disazo pigments, and condensed polycyclic pigments. Specific examples thereof include C.I. Pigment Yellow 3, 12, 13, 14, 15, 17, 62, 65, 73, 74, 83, 93, 97, 120, 138, 155, 180, 181, 185, 186, and 213.

Examples of the magenta colorant include compounds such as azo pigments including monoazo pigments and disazo pigments, and condensed polycyclic pigments. Specific examples thereof include C.I. Pigment Red 31, 48, 57:1, 58, 60, 63, 64, 68, 81, 83, 87, 88, 89, 90, 112, 114, 122, 123, 144, 146, 149, 150, 163, 170, 184, 185, 187, 202, 206, 207, 209, 237, 238, 251, 254, 255, 269, and C.I. Pigment Violet 19.

Each colorant can be used singly or in combination of two or more.

<Releasing Agent>

The toner particle may contain a releasing agent. As the releasing agent, a hydrocarbon wax is preferable because it has high phase separability against the styrene-acrylic-based resin and has a high releasing effect.

Examples of the hydrocarbon wax include: aliphatic hydrocarbon-based waxes such as low molecular weight polyethylene, low molecular weight polypropylene, microcrystalline wax, paraffin wax, Fischer-Tropsch wax; oxides of aliphatic hydrocarbon waxes such as oxidized polyethylene waxes or block copolymers thereof; and waxes grafted onto aliphatic hydrocarbon wax by using vinyl-based monomers such as styrene and acrylic acid.

The content ratio of the hydrocarbon wax in the toner particle is preferably 0.5 to 20.0 parts by mass with respect to 100 parts by mass of the binder resin.

<Polar Resin>

The toner particle may contain a polar resin. Examples of the polar resin include polyester-based resins. Using the polyester-based resin as the polar resin can provide high heat resistance when the polyester-based resin is unevenly distributed on the surface of the toner particle to form a shell.

Examples of the polyester-based resin include a condensation polymer of an alcohol monomer and a carboxylic acid monomer. Examples of the alcohol monomer include the following.

Alkylene oxide adducts of bisphenol A such as polyoxypropylene (2.2)-2,2-bis(4-hydroxyphenyl)propane, polyoxypropylene (3.3)-2,2-bis(4-hydroxyphenyl)propane, polyoxyethylene (2.0)-2,2-bis(4-hydroxyphenyl) propane, polyoxypropylene (2.0)-polyoxyethylene (2.0)-2,2-bis(4-hydroxyphenyl)propane, and polyoxypropylene (6)-2,2-bis (4-hydroxyphenyl)propane; ethylene glycol, diethylene glycol, triethylene glycol, 1,2-propanediol, 1,3-propanediol, 1,4-butanediol, neopentyl glycol, 1,4-butenediol, 1,5-pentanediol, 1,6-hexanediol, 1,4-cyclohexanedimethanol, dipropylene glycol, polyethylene glycol, polypropylene glycol, polytetramethylene glycol, bisphenol A, hydrogenated bisphenol A, 1,2,3,6-hexanetetrol, pentaerythritol, dipentaerythritol, tripentaerythritol, 1,2,4-butanetriol, 1,2,5-pentanetriol, glycerol, 2-methylpropanetriol, 2-methyl-1,2,4-butanetriol, trimethylolethane, trimethylolpropane, and 1,3,5-tribydroxymethylbenzene.

Whereas, examples of the carboxylic acid monomer include the following.

Aromatic dicarboxylic acids such as phthalic acid, isophthalic acid, and terephthalic acid, or anhydrides thereof; alkyldicarboxylic acids such as succinic acid, adipic acid, sebacic acid, and azelaic acid, or anhydrides thereof; succinic acid substituted with an alkyl group or alkenyl group having 6 to 18 carbon atoms, or anhydrides thereof; and unsaturated dicarboxylic acids such as fumaric acid, maleic acid, and citraconic acid, or anhydrides thereof.

In addition, the following compounds can be used as other monomers for obtaining the polyester-based resin.

Polycarboxylic acids such as trimellitic acid, pyromellitic acid, benzophenone tetracarboxylic acid, and anhydrides thereof.

The content ratio of the polar resin in the toner particle is preferably 1.0 to 20.0 parts by mass, and more preferably 2.0 to 10.0 parts by mass, with respect to 100.0 parts by mass of the binder resin or the polymerizable monomer that generates the binder resin. In addition, the glass transition temperature (Tg) of the polar resin is preferably 60.0° C. or more and less than 90.0° C. from the viewpoint of heat resistance.

Hereinafter, the method for producing the toner according to the present invention will be described in detail.

The method for producing the toner according to the present invention is not particularly limited, and either a dry method (for example, a kneading and pulverizing method) or a wet method (for example, an emulsion aggregation method, a suspension polymerization method, and a dissolution suspension method) may be used. Of these, a suspension polymerization method is preferably used.

Hereinafter, the suspension polymerization method will be described in detail.

<Step of Preparing Polymerizable Monomer Composition>

A polymerizable monomer composition is prepared by mixing a polymerizable monomer capable of producing a binder resin containing a styrene-acrylic-based copolymer and other components such as an ester compound, and as necessary, a crosslinking agent, a colorant, a releasing agent, and a polar resin.

The colorant may be previously dispersed in a polymerizable monomer or an organic solvent with, for example, a medium stirring mill and then mixed with other composition components, or may be dispersed after all the composition components are mixed.

<Granulating Step of Particle of Polymerizable Monomer Composition>

An aqueous medium containing a dispersion stabilizer is prepared and put into, for example, a stirred vessel provided with a stirrer having a high shear force such as CLEARMIX (manufactured by M Technique Co., Ltd.). The polymerizable monomer composition is added thereto and stirred to disperse the polymerizable monomer composition to form a particle of the polymerizable monomer composition in an aqueous medium. Examples of the dispersion stabilizer include a known surfactant, an organic dispersant, or an inorganic dispersant, and the inorganic dispersant can be preferably used because the inorganic dispersant hardly loses stability regardless of a polymerization temperature or a lapse of time, is easily washed, and hardly affects the toner.

Examples of the inorganic dispersant include the following.

Polyvalent metal phosphate salts such as tricalcium phosphate, magnesium phosphate, aluminum phosphate, and zinc phosphate; carbonates such as calcium carbonate and magnesium carbonate; inorganic salts such as calcium metasilicate, calcium sulfate, and barium sulfate; calcium hydroxide, magnesium hydroxide, aluminum hydroxide; and inorganic oxides such as silica, bentonite, and alumina.

The inorganic dispersant can be almost completely removed by adding an acid or an alkali to dissolve the inorganic dispersant after completion of the polymerization.

<Polymerization Step>

The polymerizable monomer contained in the particle of the obtained polymerizable monomer composition is polymerized to provide a resin particle dispersion. A binder resin is produced by polymerizing the polymerizable monomer. In the polymerization step, a common stirred vessel capable of adjusting temperature can be used.

The polymerization temperature is preferably 40° C. or more, and more preferably 50 to 90° C. The polymerization temperature may be constant throughout; however, may be raised in the second half of the polymerization step in order to obtain a desired molecular weight distribution. As the impeller used for stirring, any impeller may be used as long as the resin particle dispersion can be floated without being retained and the temperature in the vessel can be maintained uniformly.

<Removal Step of Volatile Component>

A volatile component removing step may be performed in order to remove, for example, unreacted polymerizable monomers from the resin particle dispersion after completion of the polymerization step. The volatile component removing step is performed by heating and stirring the resin particle dispersion in a stirred vessel equipped with a stirring unit. The heating condition during the volatile component removing step is appropriately adjusted in consideration of the vapor pressure of a component to be removed such as a polymerizable monomer. The volatile component removing step can be performed under normal pressure or reduced pressure.

<Cooling Step>

Before sending the resin particle dispersion after completion of the volatile component removing step to the next step, a cooling step may be performed to lower the liquid temperature. The presence state of the ester compound in the toner can be changed by the conditions of the cooling step.

The cooling condition can be determined by a cooling start temperature, a cooling rate, and a cooling end temperature. The cooling start temperature is preferably any temperature higher than the crystallization temperature of the ester compound in the binder resin. Furthermore, at the temperature of 90° C. or more, the binder resin is sufficiently softened and is in a state of being sufficiently compatible with the liquefied ester compound, which is preferable. When rapid cooling is performed from such a state to a temperature equal to or less than the Tg of the binder resin, the curing of the binder resin accompanying the cooling is sufficiently fast, and thus an ester compound which is easily oriented and grown becomes a crystal at an approximate temperature of the crystallization, and can be finely dispersed in the entire toner as fine domains.

The cooling rate is preferably 20° C./min or more, and more preferably 60° C./min or more. In addition, the cooling end temperature is preferably equal to or less than the glass transition temperature (Tg) of the binder resin. When the cooling end temperature is within the above range, the growth of the domain of the ester compound can be suppressed by curing the binder resin.

In addition, the presence state of the domain of the ester compound can be confirmed by observing the cross section of the toner particle with a scanning transmission electron microscope.

<Solid-Liquid Separation Step, Washing Step, and Drying Step>

The toner particle dispersion may be treated with an acid or an alkali in order to remove the dispersion stabilizer attached to the surface of the toner particle. The dispersion stabilizer is removed from the toner particle, and then the toner particle is separated from the aqueous medium by a common solid-liquid separation method; however, in order to completely remove the acid or alkali and the dispersion stabilizer component dissolved therein, the toner particle is preferably washed by adding water again. This washing step is repeated several times, and sufficient washing is performed, and then the toner particle can be obtained by solid-liquid separation again. The obtained toner particle may be dried by a known drying method as necessary.

The weight average particle diameter of the obtained toner particle is preferably 3 to 10 μm, and more preferably 4 to 8 μm. The weight average particle diameter of the toner particle can be controlled by the amount of addition of the dispersion stabilizer used in the granulation step.

<External Addition Step>

An external additive may be added to the obtained toner particle in order to improve, for example, flowability, chargeability, and blocking property. The external addition step is performed by placing the external additive and the toner particle in a mixing device such as an FM mixer (manufactured by NIPPON COKE & ENGINEERING CO., LTD.) and sufficiently mixing them.

Examples of the external additive include inorganic fine particle having a number average particle diameter of primary particle of 4 to 80 nm, and preferable examples thereof include inorganic fine particle having 6 to 40 nm.

Performing the hydrophobic treatment on the inorganic fine particle can further improve the chargeability and the environmental stability of the toner. Examples of the treatment agent used in the hydrophobic treatment include silicone varnishes, various modified silicone varnishes, silicone oils, various modified silicone oils, silane compounds, silane coupling agents, other organic silicon compounds, and organic titanium compounds. The treatment agent may be used singly or in combination of two or more.

Examples of the inorganic fine particle include silica fine particle, titanium oxide fine particle, and alumina fine particle. The silica fine particle that can be used is, for example, both dry silica produced by vapor phase oxidation of a silicon halide, which is called a dry method or fumed silica, and so-called wet silica produced from, for example, water glass.

The content of the inorganic fine particle in the toner is preferably 0.1 to 5.0 parts by mass with respect to 100.0 parts by mass of the toner particle.

Hereinafter, a method for measuring each physical property of the toner will be described.

<Method for Separating Binder Resin and Ester Compound from Toner>

The toner is dissolved in tetrahydrofuran (THF), and the solvent is distilled off under reduced pressure from the obtained soluble component to provide a tetrahydrofuran (THF) soluble component of the toner. The tetrahydrofuran (THF) soluble component of the obtained toner is dissolved in chloroform to prepare a sample solution having a concentration of 25 mg/ml. 3.5 ml of the obtained sample solution is injected into the following apparatus, and a low-molecular-weight component derived from an ester compound having a molecular weight of less than 2000 and a high-molecular-weight component derived from a binder resin having a molecular weight of 2000 or more are fractionated under the following conditions. The conditions of fractionation are as follows.

Fractional GPC apparatus: fractional HPLC (trade name: LC-980, manufactured by Japan Analytical Industry Co., Ltd.)

Fractional column: JAIGEL 3H, JAIGEL 5H (manufactured by Japan Analytical Industry Co., Ltd.)

Eluent: chloroform

Flow rate: 3.5 mL/min

After the fractionation, the solvent is distilled off under reduced pressure, and further drying is performed under reduced pressure in an atmosphere of 90° C. for 24 hours.

<Measurement of Molecular Weight of Ester Compound by Mass Spectrometry>

Separation of Ester Compound from Toner

The molecular weight of the ester compound can be measured as it is in the toner; however, is more preferably measured after the separation operation.

The toner is dispersed in ethanol which is a poor solvent for the toner, and the temperature is raised to a temperature more than the melting point of the ester compound. Then, pressurization may be performed as necessary. The ester compound exceeding the melting point by this operation is melted and extracted into ethanol. When the toner is pressurized in addition to heating, the ester compound can be separated from the toner by solid-liquid separation while being pressurized.

Subsequently, the extract is dried and solidified to provide an ester compound.

Identification and Molecular Weight Measurement of Ester Compound by Pyrolysis GCMS Mass spectrometer: ISQ manufactured by Thermo Fisher Scientific Inc.

GC apparatus: FocusGC manufactured by Thermo Fisher Scientific Inc.

Ion source temperature: 250° C.

Ionization method: EI

Mass range: 50-1000 m/z

Column: HP-5MS [30 m]

Thermal decomposition apparatus: JPS-700 manufactured by Japan Analytical Industry Co., Ltd.

To a pyrofoil at 590° C. are added a small amount of an ester compound separated by an extraction operation and 1 μL of tetramethylammonium hydroxide (TMAH). The produced sample is subjected to pyrolysis GCMS measurement under the above conditions to provide peaks for each of the alcohol component and the carboxylic acid component derived from the ester compound. The alcohol component and the carboxylic acid component are detected as methylated products by the action of TMAH as a methylating agent. The molecular weight can be determined by analyzing the obtained peak and identifying the structure of the ester compound.

Identification and molecular weight measurement of ester compound by direct introduction method Mass spectrometer: ISQ manufactured by Thermo Fisher Scientific Inc.

Ion source temperature: 250° C., Electron energy: 70 eV

Mass range: 50-1000 m/z (CI)

Reagent Gas: methane (CI)

Ionization method: Direct Exposure Probe DEP manufactured by Thermo Fisher Scientific Inc., 0 mA (10 sec)-10 mA/sec-1000 mA (10 sec)

The ester compound separated by the extraction operation is directly placed on the filament portion of the DEP unit to perform measurement. The molecular ion of the mass spectrum of the main component peak around 0.5 minutes to 1 minute of the obtained chromatogram is confirmed, the ester compound is identified, and the molecular weight is determined.

<Method for Measuring Content of Ester Compound in Toner>

The content X of the ester compound in the toner can be measured by using a thermal analyzer (trade name: DSC Q2000, manufactured by TA Instruments Japan Inc.).

About 5.0 mg of a toner sample is placed in a sample container of an aluminum pan (KITNO.0219-0041), and the sample container is placed on a holder unit and set in an electric furnace.

The toner sample is heated from 30° C. to 200° C. at a temperature rising rate of 10° C./min in a nitrogen atmosphere, a DSC curve is measured with a differential scanning calorimeter (DSC), and an endothermic amount of the ester compound in the toner sample is calculated. In addition, the endothermic amount is calculated by the same method with a single sample of about 5.0 mg of an ester compound. Then, using the endothermic amount of the ester compound obtained in the respective measurements, the content of the ester compound is determined by following formula (II).

$$\text{Content of ester compound in toner } X \text{ (\% by mass)} = \text{(endothermic amount of ester compound in toner sample (J/g))/(endothermic amount of single ester compound (J/g))} \times 100 \quad \text{(II)}$$

The number of moles can be determined from the mass and molecular weight of the ester compound in the toner determined as described above.

<Composition Analysis of Binder Resin>

Method for Separating Binder Resin from Toner 100 mg of the toner is dissolved in 3 mL of chloroform. Subsequently, an insoluble component is removed by suction filtration using a syringe equipped with a sample processing filter (the pore size is 0.2 to 0.5 and for example, MyShoriDisk H-25-2 (manufactured by Tosoh Corporation) is used).

A soluble component is introduced into fractional HPLC (Apparatus: LC-9130 NEXT manufactured by Japan Analytical Industry Co., Ltd., fractional column [60 cm] exclusion limit:20,000, 70,000 when two columns were connected), and a chloroform eluent is fed. When a peak can be confirmed by the display of the resulting chromatograph, a fraction of the retention time having a molecular weight of 2000 or more is fractionated with a monodisperse polystyrene standard sample. The solution of the obtained fraction is dried and solidified to provide a binder resin, and the weight thereof is calculated.

Measurement of Composition Ratio and Weight Ratio by Nuclear Magnetic Resonance Spectroscopy (NMR)

1 mL of heavy chloroform is added to 20 mg of the toner, and an NMR spectrum of protons of the dissolved binder resin is measured. The molar ratio and the weight ratio of each monomer can be calculated from the obtained NMR spectrum to determine the content ratio of units derived from styrene. For example, in the case of a styrene-acrylic-based copolymer, the composition ratio and the weight ratio can be calculated based on a peak around 6.5 ppm derived from a styrene monomer and a peak around 3.5-4.0 ppm derived from an acrylic monomer.

The number of moles of the unit represented by the formula (1) can be determined from the weight and the weight ratio of the binder resin in the toner determined as described above and the molecular weight that can be calculated from the composition.

In addition, for example, when the toner contains a polyester resin widely known as a binder resin of the toner, the content ratio of units derived from styrene can be determined as follows. That is, the molar ratio and the weight ratio are calculated by combining the peak derived from each monomer constituting the polyester resin and the peak derived from the styrene-acrylic copolymer.

NMR apparatus: RESONANCE ECX500 manufactured by JEOL Ltd.

Observation nucleus: proton

Measurement mode: single pulse

<Method for Measuring Weight Average Particle Diameter (D4)>

The weight average particle diameter (D4) of the toner or the toner particle can be calculated as follows.

A measuring apparatus to be used is a precision particle diameter distribution measuring apparatus equipped with a 100 μm aperture tube with a pore electrical resistance method, "Multisizer 3 COULTER COUNTER" (registered trademark, manufactured by Beckman Coulter, Inc.).

For setting of measurement conditions and analysis of measurement data, the attached dedicated software "Beckman Coulter Multisizer 3 Version 3.51" (manufactured by Beckman Coulter, Inc.) is used. The measurement is performed with 25,000 effective measurement channels.

The electrolytic aqueous solution that can be used for the measurement is an aqueous electrolyte solution prepared by dissolving special grade sodium chloride in ion-exchanged water so as to have a concentration of 1.0%, for example, "ISOTON II" (manufactured by Beckman Coulter, Inc.).

Before measurement and analysis, the dedicated software is set as follows.

On the display of the dedicated software "change of standard measurement method (SOMME)", the total count number in the control mode is set to 50,000 particles, the number of measurements is set to 1, and the Kd value is set to a value obtained by using "standard particle 10.0 μm" (manufactured by Beckman Coulter, Inc.). Pressing "threshold/noise level measurement button" sets the threshold and the noise level automatically. In addition, the current is set to 1,600 μA, the gain is set to 2, the electrolytic solution is set to ISOTON II, and "Flash of aperture tube after measurement" is checked.

On the display of the dedicated software "conversion setting from pulse to particle diameter", the bin interval is set to logarithmic particle diameter, the particle diameter bin is set to 256 particle diameter bins, and the particle diameter range is set to 2 to 60

Specific measurement methods are as follows.

(1) 200.0 mL of an aqueous electrolyte solution is placed in a 250 mL glass round-bottom beaker dedicated to the Multisizer 3, the beaker is set on a sample stand, and stirring with a stirrer rod is performed counterclockwise at 24 revolutions/sec. Then, dirt and air bubbles in the aperture tube are removed by the "flushing aperture tube" function of the dedicated software.

(2) 30.0 mL of an aqueous electrolyte solution is placed in a 100 mL flat-bottom beaker made of glass. Thereto is added 0.3 mL of a diluent obtained by diluting "Contaminon N" (10% aqueous solution of neutral detergent for washing precision measuring apparatus at pH 7 composed of nonionic surfactant, anionic surfactant, and organic builder, manufactured by Wako Pure Chemical Industries, Ltd.) as a dispersant 3 times by mass with ion-exchanged water.

(3) There is prepared an ultrasonic disperser "Ultrasonic Dispersion System Tetra 150" (manufactured by Nikkaki Bios Co., Ltd.) having an electrical output of 120 W with incorporating 2 oscillators having an oscillation frequency of 50 kHz in a state where the phase is shifted by 180 degrees. 3.3 L of ion-exchanged water is placed in a water tank of the ultrasonic disperser, and 2.0 mL of Contaminon N is added to this water tank.

(4) The beaker in the above (2) is set in the beaker fixing hole of the ultrasonic disperser, and the ultrasonic disperser is operated. Then, the height position of the beaker is adjusted so that the resonance state of the liquid level of the aqueous electrolyte solution in the beaker is maximized.

(5) While the aqueous electrolyte solution in the beaker of (4) is irradiated with ultrasonic waves, 10 mg of the toner or the toner particle is added to the aqueous electrolyte solution little by little and dispersed. Then, the ultrasonic dispersion treatment is further continued for 60 seconds. In the ultrasonic dispersion, the water temperature of the water tank is appropriately adjusted to 10 to 40° C.

(6) The aqueous electrolyte solution of (5) in which toner or toner particle is dispersed by using a pipette is added dropwise to the round bottom beaker of (1), and the measurement concentration is adjusted to 5%. Then, the measurement is performed until the number of measurement particles reaches 50,000.

(7) The measurement data is analyzed with dedicated software attached to the apparatus to calculate the weight average particle diameter (D4). The "average diameter" on the display of "analysis/volume statistical value (arithmetic mean)" is the weight average particle diameter (D4) when graph/volume % is set in the dedicated software.

<Observation of Cross-Section of Toner Particle in Scanning Transmission Electron Microscope>

The domains of the ester compound in the toner particle are confirmed by observing the cross section of the toner particle with a scanning transmission electron microscope.

In the cross-sectional image of the toner particle with a scanning transmission electron microscope, the ester compound is observed as a domain. The presence state of the ester compound is specified by measuring the number and shape of the domains of the ester compound.

The observation procedure of the cross section of the toner particle is as follows.

The toner particles are embedded in a visible light curable embedded resin (trade name: D-800, manufactured by Nisshin EM Co., Ltd.) and cut to a thickness of 70 nm with an ultrasonic ultramicrotome (trade name: UC7, manufactured by Leica Microsystems).

Of the obtained thin piece samples, 10 pieces in which the diameter of the cross section of the toner particle is within the weight average particle diameter (D4)±2.0 μm are arbitrary selected.

The selected thin piece sample is dyed for 15 minutes in an atmosphere of $RuO_4$ gas having 500 Pa by using a vacuum dyeing apparatus (trade name: VSC4R1H, manufactured by Filgen, Inc.). Thereafter, a scanning image mode of a scanning transmission electron microscope (trade name: JEM 2800, manufactured by JEOL Ltd.) is used to create a STEM image.

The STEM probe size is 1 nm and the image size is 1024×1024 pixels, and STEM images are acquired under the following conditions.

Detector Control panel for bright-field image
Contrast: 1425
Brightness:3750
Image Control panel
Contrast: 0.0
Brightness: 0.5
Gammma: 1.00

The obtained STEM image is binarized (threshold 120/255 stage) with image processing software "Image-Pro Plus (manufactured by Media Cybernetics, Inc.)" to clarify the distinction between the domain of the ester compound and the region of the binder resin.

A portion appearing white when the threshold value for binarization is 210 shows the domain of the ester compound.

<Identification of Domain of Ester Compound>

In a toner containing a releasing agent, the domain of the releasing agent may appear white on the STEM image like the domain of the ester compound. In such a case, the domain is identified by the following procedure.

When the crystalline material can be obtained as a raw material, the crystal structure thereof is observed in the same manner as the method for observing the cross section of the toner particle subjected to the ruthenium stain with the transmission electron microscope as described above to provide images of lamellar structures of both crystals of the releasing agent and the ester compound. When these structures are compared with the lamellar structure of the domain in the cross section of the toner particle and the lamellar spacing has an error of 10% or less, the raw material forming the domain in the cross section of the toner particle can be identified.

<Method for Calculating Average Number of Domains and Average Major Axis of Ester Compound>

In the STEM images of the cross sections of the selected 10 toner particles, the number of domains of each ester compound is counted, and the average value thereof is taken as the average number of the domains.

In addition, in the STEM images of the cross sections of the selected 10 toner particles, the maximum diameters of the domains included in the respective toner particles are all measured, and the average value thereof is taken as the average major diameter r1 (μm) of the domains.

The present invention can provide a toner having excellent low-temperature fixability and capable of suppressing occurrence of color tone unevenness and gloss reduction in a formed image.

EXAMPLES

Hereinafter, the toner of the present invention will be described in detail with examples and comparative examples. In the following description of examples, "part" is on a mass basis unless otherwise specified.

<Production of Magnetic Material 1>

55 L of a 4.0 mol/L aqueous sodium hydroxide solution was mixed with 50 L of a ferrous sulfate aqueous solution containing 2.0 mol/L of $Fe^{2+}$ and the mixture was stirred to provide a ferrous salt aqueous solution including a ferrous hydroxide colloid. This aqueous solution was maintained at 85° C., and an oxidation reaction was performed while air was blown at 20 L/min to provide a slurry including core particles.

The obtained slurry was filtered by a filter press, washed, and then the core particles were dispersed again in water and reslurried. Sodium silicate in an amount of 0.2% by mass in terms of silicon per 100.0 parts of the core particles was added to the reslurry, the pH of the slurry was adjusted to 6.0, and the slurry was stirred to provide magnetic iron oxide particles having a silicon-rich surface.

The obtained slurry was filtered by a filter press, washed, and then further reslurried with ion-exchanged water. 500.0 parts (10.0% by mass with respect to magnetic iron oxide) of an ion exchange resin (trade name: SK110, manufactured by Mitsubishi Chemical Corporation) was added to the reslurry (solid content: 50 g/L), and the mixture was stirred for 2 hours to perform ion exchange. Thereafter, the ion exchange resin was removed by filtration with a mesh, filtered with a filter press, washed, and then dried and crushed to provide magnetic iron oxide having a number average particle diameter of 0.23 μm.

Subsequently, a surface treatment agent was prepared. 30.0 parts of iso-butyltrimethoxysilane was added dropwise to 70.0 parts of ion-exchanged water with stirring. Thereafter, this aqueous solution was held at a pH of 5.5 and a temperature of 55° C., and dispersed by using a disper impeller at a peripheral speed of 0.46 m/s for 120 minutes to perform hydrolysis. Thereafter, the pH of the aqueous solution was adjusted to 7.0, and the aqueous solution was cooled to 10° C. to stop the hydrolysis reaction. Thus, an aqueous solution containing a silane compound was obtained.

100.0 parts of magnetic iron oxide was placed in a high speed mixer (trade name: Model LFS-2, manufactured by Fukae Powtec Co., Ltd.), and 8.0 parts of an aqueous solution containing a silane compound was added dropwise thereto over 2 minutes while stirring the mixture at a rotation speed of 2000 rpm. Thereafter, mixing and stirring were performed for 5 minutes. Subsequently, in order to enhance the fixability of the silane compound, the mixture was dried at 40° C. for 1 hour to reduce the moisture, and then the mixture was dried at 110° C. for 3 hours to proceed the condensation reaction of the silane compound. Thereafter, the mixture was crushed and passed through a sieve with a mesh size of 100 μm to provide a magnetic material 1.

<Production of Toner 1>

450 parts of a 0.1 mol/L-$Na_3PO_4$ aqueous solution was added to 720 parts of ion-exchanged water, the mixture was heated to a temperature of 60° C., and then 67.7 parts of a 1.0 mol/L-$CaCl_2$ aqueous solution was added thereto to provide an aqueous medium including a dispersion stabilizer. Subsequently, the following materials were prepared.

81.0 parts of styrene
14.0 parts of n-butyl acrylate
5.0 parts of n-lauryl acrylate
1.5 parts of a crosslinking agent represented by following formula (5)

(5)

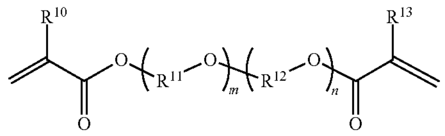

where, $R^{10}$ and $R^{13}$ are a hydrogen atom, and $R^{12}$ are an isopropyl group, and m+n is 7.

65.0 parts of magnetic material 1
4.0 parts of polar resin (polyester resin, acid value: 8.0 mg KOH/g, glass transition temperature: 69° C., weight average molecular weight: 9500)

These materials were uniformly dispersed and mixed by using an attritor (manufactured by NIPPON COKE & ENGINEERING CO., LTD.). The obtained monomer composition was heated to a temperature of 60° C., and the following materials were mixed and dissolved therein to provide a polymerizable monomer composition.

15.0 parts of ethylene glycol distearate
5.0 parts of hydrocarbon wax (Fischer-Tropsch wax, melting point 77° C.)
9.0 parts of polymerization initiator (t-butyl peroxypivalate (25% toluene solution))

The polymerizable monomer composition was charged into the aqueous medium obtained above, and a granulation step was performed for 10 minutes at a temperature of 60° C. under a nitrogen atmosphere while maintaining 15,000 rotations/minutes with CLEARMIX (manufactured by M Technique Co., Ltd.).

Thereafter, the mixture was stirred with a paddle impeller, and a polymerization reaction was performed at a reaction temperature of 70° C. for 300 minutes. After completion of the reaction, the suspension was heated to 100° C. and held for 2 hours. Thereafter, as a cooling step, water at 0° C. was added to the suspension, and the suspension was cooled from 98° C. to 30° C. at a rate of 60° C./min. Thereafter, the dispersion stabilizer was dissolved by adding hydrochloric acid to the suspension and sufficiently washing the suspension, and filtration and drying were performed to provide a toner particle 1.

Subsequently, to 100.0 parts of the toner particle 1, 0.3 parts of sol-gel silica fine particles having a number average particle diameter of primary particles of 115 nm were added, and mixed by using an FM mixer (manufactured by NIPPON COKE & ENGINEERING CO., LTD.).

In addition, silica fine particles having a number average particle diameter of primary particles of 12 nm were treated with silicone oil to prepare hydrophobic silica fine particles having a treated BET specific surface area value of 120 $m^2/g$. 0.9 parts of the hydrophobic silica fine particles were further added to the toner particle 1, and were mixed in the same manner by using an FM mixer (manufactured by NIPPON COKE & ENGINEERING CO., LTD.) to provide a toner 1.

<Production of toners 2 to 4, 6 to 23, and 25 and 26>

In the production of the toner 1, the type and number of parts of the material used were changed as shown in Table 1. Furthermore, in the production of the toners 17, 25, and 26, the temperature of the suspension was lowered from 98° C. to 30° C. by leaving the suspension at room temperature for 12 hours without performing a cooling step. The cooling rate at this time was 0.09° C./min. Toners 2 to 4, 6 to 23, and 25 and 26 were obtained in the same manner as the toner 1 except for the above.

<Production of Toner 5>

In the production of the toner 1, the amounts of styrene, n-butyl acrylate, and n-lauryl acrylate were changed as shown in Table 1. In addition, 10.0 parts of low molecular weight polystyrene (glass transition temperature: 55° C., weight average molecular weight:3,000) was added to the monomer composition. A toner 5 was obtained in the same manner as the toner 1 except for the above.

<Production of Toner 24>

The following materials were prepared.

72.0 parts of styrene
18.0 parts of n-butyl acrylate
10.0 parts of n-lauryl acrylate
4.0 parts of low molecular weight polystyrene (glass transition temperature: 55° C., weight average molecular weight: 3,000)
0.7 parts of 1,6-hexanediol diacrylate
5.0 parts of copper phthalocyanine pigment (C.I. Pigment Blue 15:3)
0.7 parts of aluminum salicylate compound (trade name: Bontron E-88, manufactured by Orient Chemical Co., Ltd.)
4.0 parts of polar resin (polyester resin, acid value: 3.9 mg KOH/g, glass transition temperature: 69° C., weight average molecular weight: 9,500)
4.0 parts of polar resin (styrene-methacrylic resin, acid value: 10 mg KOH/g, glass transition temperature: 80° C., weight average molecular weight: 15,000)
15.0 parts of ethylene glycol distearate These materials were mixed to prepare a mixture of polymerizable monomers. Then, 15 mm ceramic beads were placed therein and dispersed for 2 hours by using a wet attritor (manufactured by NIPPON COKE & ENGINEERING CO., LTD.) to provide a polymerizable monomer composition.

Whereas, 6.3 parts of sodium phosphate ($Na_3PO_4$) was added to 414.0 parts of ion-exchanged water, and the mixture was heated to 60° C. with stirring using CLEARMIX (manufactured by M Technique Co., Ltd.).

Thereafter, an aqueous calcium chloride solution obtained by dissolving 3.6 parts of calcium chloride ($CaCl_2$)) in 25.5 parts of ion-exchanged water was added, and stirring was further continued to prepare an aqueous medium including a dispersion stabilizer composed of tricalcium phosphate ($Ca_3(PO_4)_2$).

9.0 parts of t-butyl peroxypivalate (25% toluene solution) as a polymerization initiator was added to the polymerizable monomer composition prepared described above, and this was charged into the aqueous medium prepared above. A granulation step was performed for 10 minutes while maintaining 15,000 rotations/minute with CLEARMIX (manufactured by M Technique Co., Ltd.).

Thereafter, polymerization was performed for 8 hours while maintaining the temperature at 70° C. by stirring with a paddle impeller, thereby providing a toner particle dispersion.

Thereafter, in order to prevent generated volatile components from returning to the reaction vessel, a common glass trap ball was attached above the reaction vessel, the temperature of the stirred vessel was heated to 98° C., and the temperature was maintained for 5 hours to perform a step of removing volatile components.

Thereafter, the toner particle dispersion was left to cool to room temperature while continuing stirring.

After the temperature of the toner dispersion reached room temperature, hydrochloric acid was added, the pH was set to 1.4 or less, the dispersion stabilizer was dissolved, and filtration, washing, and drying were performed to provide a toner particle 24.

0.3 parts of hydrophobic titanium oxide was added to 100.0 parts of the obtained toner particle, and the mixture was mixed by an FM mixer (manufactured by NIPPON COKE & ENGINEERING CO., LTD.). Furthermore, 1.5 parts of hydrophobic silica was added, and the mixture was mixed by the FM mixer to provide a toner 24 to which an external additive was added.

TABLE 1

| | Styrene | n-BA | Long chain acrylate | | Other binder resin | | Ester compound | | Crosslinker | | Cooling |
|---|---|---|---|---|---|---|---|---|---|---|---|
| Toner | Amount (parts) | Amount (parts) | Type | Amount (parts) | Type | Amount (parts) | Type | Amount (parts) | Type | Amount (parts) | rate (° C./min) |
| 1 | 81.0 | 14.0 | n-LA | 5.0 | — | | EGDS | 12.0 | Formula (5) | 1.5 | 60 |
| 2 | 81.0 | 14.0 | n-LA | 5.0 | — | | EGDS | 12.0 | Formula (5) | 1.5 | 100 |
| 3 | 81.0 | 14.0 | n-LA | 5.0 | — | | EGDS | 12.0 | 1,6-HDODA | 0.7 | 60 |
| 4 | 81.0 | 14.0 | n-LA | 5.0 | — | | EGDS | 12.0 | DVB | 0.5 | 60 |
| 5 | 71.0 | 14.0 | n-LA | 5.0 | LM-PS | 10.0 | EGDS | 12.0 | Formula (5) | 1.5 | 60 |
| 6 | 81.0 | 14.0 | n-LA | 5.0 | — | | EGDS | 15.0 | Formula (5) | 1.5 | 60 |
| 7 | 81.0 | 14.0 | n-LA | 5.0 | — | | EGDS | 10.0 | Formula (5) | 1.5 | 60 |
| 8 | 83.0 | 7.0 | n-LA | 10.0 | — | | EGDS | 20.0 | Formula (5) | 1.5 | 60 |
| 9 | 81.0 | 14.0 | n-LA | 5.0 | — | | EGDS | 12.0 | DVB | 0.5 | 10 |
| 10 | 81.0 | 14.0 | n-LA | 5.0 | — | | EGDS | 25.0 | DVB | 0.5 | 10 |
| 11 | 80.0 | 17.0 | n-LA | 3.0 | — | | EGDS | 5.0 | DVB | 0.5 | 10 |
| 12 | 78.0 | 21.0 | n-LA | 1.0 | — | | EGDS | 5.0 | DVB | 0.5 | 10 |
| 13 | 85.0 | 0.0 | n-LA | 15.0 | — | | EGDS | 25.0 | DVB | 0.5 | 10 |
| 14 | 84.5 | 0.0 | n-LA | 15.5 | — | | EGDS | 26.0 | DVB | 0.5 | 10 |
| 15 | 84.5 | 0.0 | n-LA | 15.5 | — | | EGDBe | 26.0 | DVB | 0.5 | 10 |
| 16 | 84.5 | 0.0 | n-LA | 15.5 | — | | BDODBe | 26.0 | DVB | 0.5 | 10 |
| 17 | 81.0 | 14.0 | n-LA | 5.0 | — | | EGDS | 12.0 | DVB | 0.5 | 0.09 |
| 18 | 81.0 | 14.0 | n-LA | 5.0 | — | | EGDS | 8.0 | DVB | 0.5 | 10 |
| 19 | 78.0 | 21.5 | n-LA | 0.5 | — | | EGDS | 5.0 | DVB | 0.5 | 10 |
| 20 | 80.0 | 16.5 | n-LA | 3.5 | — | | EGDS | 5.0 | DVB | 0.5 | 10 |
| 21 | 80.0 | 16.0 | n-LA | 4.0 | — | | EGDS | 25.0 | DVB | 0.5 | 10 |
| 22 | 84.0 | 0.0 | n-LA | 16.0 | — | | EGDS | 25.0 | DVB | 0.5 | 10 |
| 23 | 84.5 | 0.0 | n-LA | 15.5 | | | CW | 26.0 | DVB | 0.5 | 10 |
| 24 | 72.0 | 18.0 | n-LA | 10.0 | LM-PS | 4.0 | EGDS | 15.0 | 1,6-HDODA | 0.7 | 0.09 |
| 25 | 83.0 | 7.0 | n-OA | 10.0 | — | | EGDS | 15.0 | 1,6-HDODA | 0.7 | 0.09 |
| 26 | 83.0 | 7.0 | n-MA | 10.0 | — | | EGDS | 15.0 | 1,6-HDODA | 0.7 | 0.09 |

The meanings of the abbreviations in Table 1 are as follows.
n-BA: n-butyl acrylate
n-OA: n-octyl acrylate
n-MA: n-myristyl acrylate
LM-PS: low molecular weight polystyrene
EDGS: ethylene glycol distearate
EDGBe: ethylene glycol dibehenate
BDODBe: butanediol dibehenate
CW: carnauba wax
1,6-HDODA: 1,6-hexanediol diacrylate
DVB: divinylbenzene In addition, the "long chain acrylate" in Table 1 refers to an acrylate compound having a long chain alkyl group used for forming the binder resin.

For the toners 1 to 26 produced above, the molar ratio of the acrylate unit having a long chain alkyl group in the binder resin to the ester compound, and the average number and average major diameter r1 of the domains of the ester compound in the toner particle are shown in Table 2.

TABLE 2

| Toner | Molar ratio of long chain acrylate unit to ester compound (—) | Ester compound domain: Average number (—) | Ester compound domain: Average major diameter r1 (μm) |
|---|---|---|---|
| 1 | 1.0 | 295 | 0.1 |
| 2 | 1.0 | 990 | 0.05 |
| 3 | 1.0 | 253 | 0.1 |
| 4 | 1.0 | 354 | 0.2 |
| 5 | 1.0 | 361 | 0.1 |
| 6 | 0.8 | 277 | 0.1 |

TABLE 2-continued

| Toner | Molar ratio of long chain acrylate unit to ester compound (—) | Ester compound domain Average number (—) | Average major diameter r1 (μm) |
|---|---|---|---|
| 7 | 1.2 | 320 | 0.2 |
| 8 | 1.2 | 336 | 0.1 |
| 9 | 1.0 | 76 | 0.6 |
| 10 | 0.5 | 60 | 0.9 |
| 11 | 1.5 | 88 | 0.6 |
| 12 | 0.5 | 50 | 0.5 |
| 13 | 1.5 | 92 | 0.7 |
| 14 | 1.5 | 49 | 0.6 |
| 15 | 1.5 | 55 | 0.8 |
| 16 | 1.5 | 56 | 0.6 |
| 17 | 1.0 | 5 | 2.5 |
| 18 | 1.6 | 48 | 1.6 |
| 19 | 0.3 | 69 | 0.4 |
| 20 | 1.7 | 60 | 0.4 |
| 21 | 0.4 | 78 | 0.6 |
| 22 | 1.6 | 81 | 0.8 |
| 23 | 1.5 | 56 | 0.5 |
| 24 | 1.7 | 5 | 3.7 |
| 25 | 1.5 | 4 | 5.2 |
| 26 | 1.5 | 7 | 4.8 |

<Evaluation>

A laser beam printer, HP LaserJet Pro M501dn, manufactured by Hewlett Packard, Inc. was modified to provide an electrophotographic apparatus for evaluation. As a modification point, the process speed was set to 1.5 times.

In addition, as the process cartridge, the CF287X was modified and used. For a modification point, a toner supply member 8 was provided in the process cartridge as illustrated in FIGURE, and a rotation direction R3 of the toner supply member 8 was set to be opposite to a rotation direction R2 of a toner carrier 7. The toner carrier 7 and an electrophotographic photosensitive member were brought into contact with each other, and the contact pressure was adjusted so that the width of the contact portion was 1.0 mm. A toner 19 was filled in a toner container 9 having a toner stirring member 20 provided in the process cartridge, and the following evaluation was performed.

The cases of using the toner 1 to 17 produced above were designated as examples 1 to 17, and the cases of using the toner 18 to 26 were designated as comparative examples 1 to 9.

<Low-Temperature Fixability>

The low-temperature fixability was evaluated in a normal temperature and normal humidity environment (temperature: 25.0° C., relative humidity: 50%).

The fixing temperature of the fixing apparatus in the electrophotographic apparatus for evaluation was modified so as to be able to set voluntarily. Using this apparatus, the temperature of the fixing apparatus was adjusted at every 5° C. in a range of 180 to 280° C., and 3 sheets of solid black images with a printing ratio of 100% were output by using FOX RIVER BOND paper (110 $g/m^2$) which is rough paper as a medium. Whether or not a void portion was present in the third solid image was visually evaluated, and the low-temperature fixability was evaluated according to the following criteria at the lowest temperature at which no void portion occurred. These evaluation results are shown in Table 3.

A: less than 200° C.

B: 200° C. or more and less than 210° C.

C: 210° C. or more and less than 220° C.

D: 220° C. or more

<Mottle of Fixed Image>

The fixing temperature of the electrophotographic apparatus for evaluation was set to a temperature of 10° C. higher than the minimum fixing temperature obtained in the above low-temperature fixability evaluation. 100 sheets of solid images were printed by using FOX RIVER BOND paper (110 $g/m^2$) which is rough paper as a medium. The mottle of the obtained image was visually confirmed and evaluated according to the following criteria. These evaluation results are shown in Table 3.

A: no mottle occurred in all 100 sheets.

B: mottle occurred in 1 to 3 sheets out of 100 sheets.

C: mottle occurred in 4 to 9 sheets out of 100 sheets.

D: mottle occurred in 10 or more sheets out of 100 sheets.

<Color Tone Unevenness of Solid Image>

The fixing temperature of the electrophotographic apparatus for evaluation was set to a temperature of 10° C. higher than the minimum fixing temperature obtained in the above low-temperature fixability evaluation, and 200 sheets of solid images were continuously printed in the double-sided printing mode by using office 70 (manufactured by Canon Inc.) as a medium. The paper bundle discharged from the discharge part was left for 30 minutes in a stacked state, and was naturally cooled to room temperature. This led to slower rate at which the printing paper is cooled, and after the fixing, the ester compound in the toner is easily oriented and grown, and the evaluation is more severe on the color tone unevenness. In the stacked paper bundle, about 100th sheet is most easily kept warm, and the color tone unevenness is easily deteriorated. Therefore, the coordinate b* value of the L*a*b* space (CIE1976) at a total of 9 points of the upper end, the center portion, and the lower end of the paper was measured by using a colorimeter for the 100th sheet of the solid image at the center of the paper bundle. The difference between the maximum value and the minimum value of the b* values of the 9 points was defined as Δb*, and the color tone unevenness was evaluated according to the following criteria. These evaluation results are shown in Table 3.

A: Δb* value was less than 1.0.

B: Δb* value was 1.0 or more and less than 2.0.

C: Δb* value was 2.0 or more and less than 3.0.

D: Δb* value was 3.0 or more.

<Gloss Reduction of Leaving Image>

The fixing temperature of the electrophotographic apparatus for evaluation was set to a temperature of 10° C. higher than the minimum fixing temperature obtained in the above low-temperature fixability evaluation. A solid image was printed in glossy paper mode (⅓ speed) by using glossy paper (HP Brochure Paper 200 g, Glossy, manufactured by Hewlett Packard, Inc., 200 $g/m^2$) as a medium. Using a handy gloss meter PG-3D (manufactured by Nippon Denshoku Industries Co., Ltd.), the gloss value of this solid image at 3 arbitrary-selected points of the image was measured under the condition of a light incident angle of 75°, and the average value thereof was taken as an initial gloss value G1. Thereafter, the image was left in a high temperature and normal humidity environment (temperature: 30.0° C., relative humidity: 50%) for 30 days, and the gloss value was measured in the same manner as described above and taken as a gloss value G2 after leaving the image. Based on the difference ΔG (=G1−G2) between the initial gloss value G1 and the gloss value G2 after leaving, the difference of the gloss reduction was evaluated according to the following criteria. These evaluation results are shown in Table 3.

A: ΔG was less than 5.

B: ΔG was 5 or more and less than 10.

C: ΔG was 10 or more and less than 15.

D: ΔG was 15 or more.

TABLE 3

| Examples/ Comparative Examples | Toner | Low-temperature fixability Evaluation | Low-temperature fixability Fixing temperature (° C.) | Mottle Evaluation | Mottle Number of sheets in which mottle occurred | Color tone unevenness Evaluation | Color tone unevenness b* | Gloss reduction Evaluation | Gloss reduction ΔG |
|---|---|---|---|---|---|---|---|---|---|
| Example 1 | 1 | A | 190 | A | 0 | A | 0.3 | A | 3 |
| Example 2 | 2 | A | 190 | A | 0 | A | 0.4 | A | 4 |
| Example 3 | 3 | A | 190 | B | 2 | A | 0.5 | A | 3 |
| Example 4 | 4 | A | 195 | C | 4 | A | 0.8 | A | 2 |
| Example 5 | 5 | A | 195 | A | 0 | A | 0.5 | A | 3 |
| Example 6 | 6 | A | 190 | A | 0 | A | 0.4 | A | 4 |
| Example 7 | 7 | A | 195 | A | 0 | A | 0.5 | A | 2 |
| Example 8 | 8 | A | 190 | A | 0 | A | 0.6 | A | 3 |
| Example 9 | 9 | B | 205 | C | 5 | B | 1.2 | A | 3 |
| Example 10 | 10 | B | 205 | C | 5 | C | 2.0 | A | 2 |
| Example 11 | 11 | C | 215 | C | 5 | B | 1.5 | B | 6 |
| Example 12 | 12 | C | 215 | C | 5 | C | 2.3 | A | 3 |
| Example 13 | 13 | B | 200 | C | 7 | B | 1.7 | C | 12 |
| Example 14 | 14 | B | 200 | C | 8 | B | 1.8 | C | 13 |
| Example 15 | 15 | B | 200 | C | 7 | C | 2.1 | C | 12 |
| Example 16 | 16 | B | 200 | C | 9 | C | 2.2 | C | 14 |
| Example 17 | 17 | C | 210 | C | 6 | C | 1.7 | B | 7 |
| Comparative Example 1 | 18 | B | 200 | C | 7 | C | 2.5 | D | 18 |
| Comparative Example 2 | 19 | C | 215 | C | 4 | D | 3.2 | A | 4 |
| Comparative Example 3 | 20 | B | 205 | C | 4 | A | 0.8 | D | 16 |
| Comparative Example 4 | 21 | B | 205 | C | 8 | D | 4.0 | A | 3 |
| Comparative Example 5 | 22 | A | 195 | C | 9 | A | 0.7 | D | 18 |
| Comparative Example 6 | 23 | C | 210 | C | 7 | B | 1.2 | D | 16 |
| Comparative Example 7 | 24 | C | 205 | B | 2 | B | 1.3 | D | 17 |
| Comparative Example 8 | 25 | C | 210 | B | 3 | D | 3.5 | D | 19 |
| Comparative Example 9 | 26 | C | 210 | B | 2 | C | 2.3 | D | 18 |

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. A toner, comprising:

a toner particle comprising a binder resin and an ester compound;

the binder resin comprising a styrene-acrylic-based resin and optionally comprising a low molecular weight polystyrene, the styrene-acrylic-based resin being a copolymer of monomers comprising (i) styrene, (ii) n-lauryl acrylate or n-lauryl methacrylate and (iii) crosslinking agent;

the styrene-acrylic-based resin containing a unit represented by formula (1) which is derived from the group (ii)

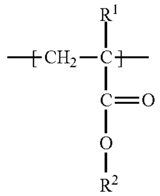

(1)

where $R^1$ represents a hydrogen atom or a methyl group, and $R^2$ represents a linear alkyl group having 12 carbon atoms; and the ester compound comprising a structure represented by formulae (2) or (3)

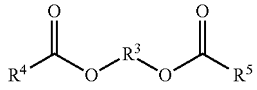

(2)

-continued

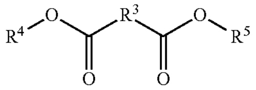

(3)

where $R^3$ represents an alkylene group having 2 to 4 carbon atoms, and $R^4$ and $R^5$ independently represent a linear alkyl group having 14 to 22 carbon atoms, wherein a molar ratio of the unit represented by formula (1) to the ester compound is 0.5 to 1.5, the styrene-acrylic-based resin is contained in the binder resin at 90.0% by mass or more, an amount of the styrene for polymerizing the styrene-acrylic-based resin is 70.0 to 84.6% by mass with respect to the total mass of the monomers and the low molecular weight polystyrene, and an amount of the crosslinking agent for polymerizing the styrene-acrylic-based resin is 0.5 to 1.5% by mass with respect to the total mass of the monomers and the low molecular weight polystyrene.

2. The toner according to claim 1, wherein the ester compound is contained in the toner particle at 5.0 to 25.0% by mass with respect to the binder resin.

3. The toner according to claim 1, wherein the binder resin comprises said low molecular weight polystyrene.

4. The toner according to claim 1, wherein the styrene-acrylic-based resin contains 1.0 to 15.0% by mass of the unit represented by formula (1).

5. The toner according to claim 1, wherein $R^3$ represents an alkylene group having 2 carbon atoms, and $R^4$ and $R^5$ independently represent a linear alkyl group having 14 to 18 carbon atoms.

6. The toner according to claim 1, wherein the styrene-acrylic-based resin further comprises a unit represented by formula (4)

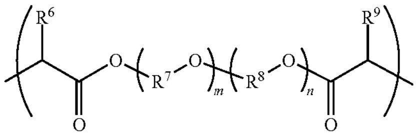

(4)

where m+n is an integer of 2 or more, $R^6$ and $R^9$ independently represent a hydrogen atom or a methyl group, and $R^7$ and $R^8$ independently represent a linear or branched hydrocarbon group having 2 to 12 carbon atoms.

7. The toner according to claim 1, wherein a domain of the ester compound exists in a cross section of the toner particle observed with a scanning transmission electron microscope, an average number of the domain in the cross section is 100 or more, and an average major diameter of the domain is 1.0 μm or less.

8. The toner according to claim 1, wherein the monomers further comprise n-butyl acrylate.

9. The toner according to claim 1, wherein $R^1$ represents a hydrogen atom.

10. The toner according to claim 1, wherein $R^1$ represents a methyl group.

* * * * *